Sept. 18, 1945.    B. P. BAKER ET AL    2,384,787
VALVE CONSTRUCTION
Filed Nov. 26, 1941    3 Sheets-Sheet 1
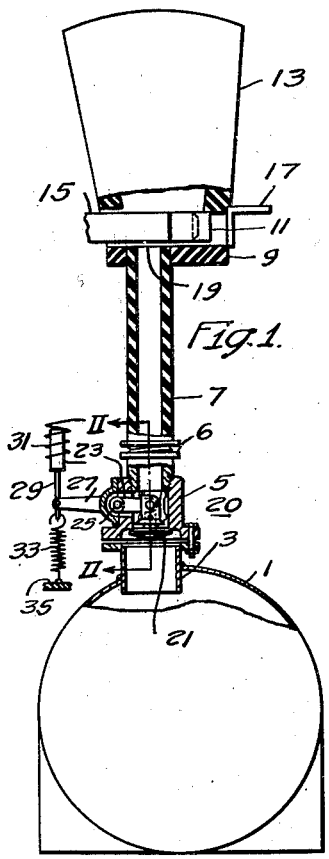
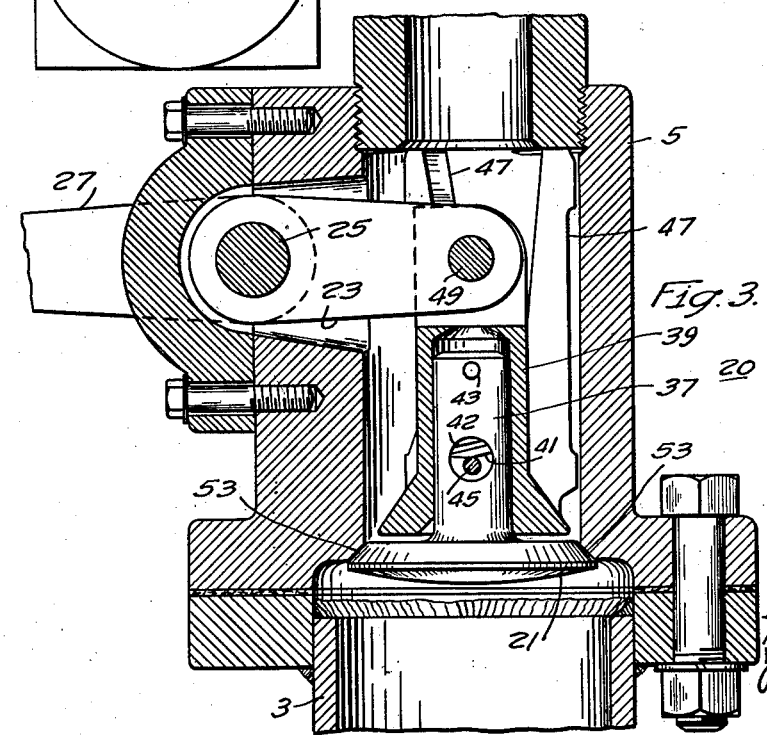
INVENTORS
Benjamin P. Baker &
Richard C. Cunningham
BY
ATTORNEY Sept. 18, 1945.   B. P. BAKER ET AL   2,384,787
VALVE CONSTRUCTION
Filed Nov. 26, 1941   3 Sheets-Sheet 2

INVENTORS
Benjamin P. Baker &
Richard C. Cunningham.
BY
Ralph H. Swingle
ATTORNEY

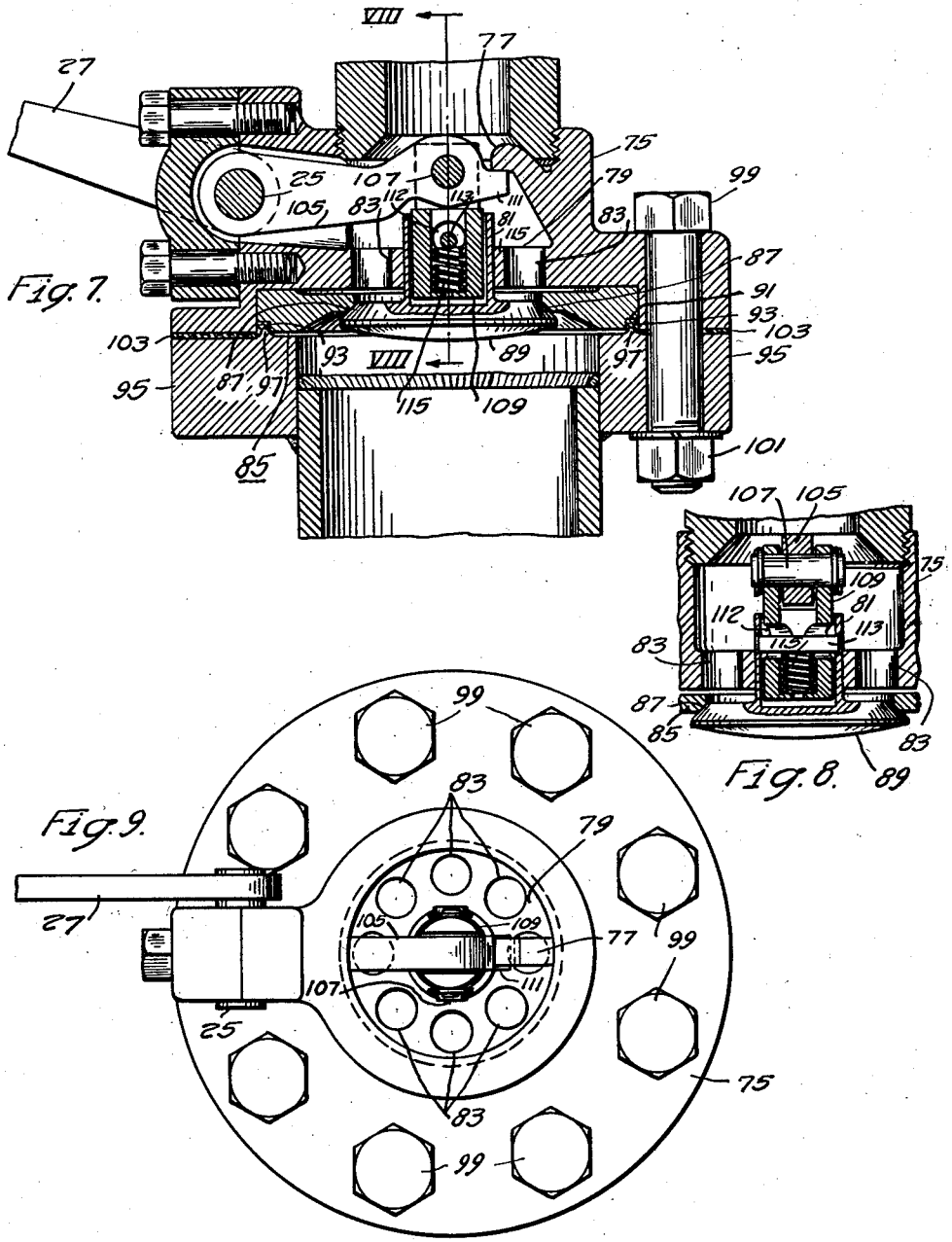

Patented Sept. 18, 1945

2,384,787

UNITED STATES PATENT OFFICE 2,384,787

VALVE CONSTRUCTION

Benjamin P. Baker, Turtle Creek, and Richard C. Cunningham, East McKeesport, Pa., assignors to Westinghouse Electric Corporation, East Pittsburgh, Pa., a corporation of Pennsylvania Application November 26, 1941, Serial No. 420,516

18 Claims. (Cl. 137—139)

This invention relates generally to valve constructions, and as specifically illustrated in this specification concerns improvements in the valve construction of compressed gas circuit interrupters. More specifically, the present invention concerns an improved valve construction which provides a plurality of means for absorbing the kinetic energy present in the different portions of the valve assembly when the valve is in operation. The present invention also concerns an improved valve construction which reduces the impact forces during the closing operation by selective loading of the valve assembly so that only a part of the kinetic energy of this assembly needs to be absorbed at the valve seat, and the remainder may be absorbed at one or more other points.

Circuit interrupters which are operated by compressed air or other gases are well known. The compressed air or other gas is used to open the circuit interrupter quickly when valves controlling the air or other gas are operated. Frequently the gas is also used to help extinguish the arc produced when the circuit interrupter is opened. In such an application of the gas there must be provided suitable valves which open and close automatically in response to the opening and closing of the circuit interrupter. Since the moving parts of such circuit interrupters are generally heavy and move very rapidly, the kinetic energy stored in the moving parts during operation of the interrupters is extremely high. When the moving parts are brought to a quick stop stresses and strains are present in the materials which tend to cause a permanent deformation of the parts and a consequent leakage of the valves. This tendency is very noticeable in the operation of the valves of compressed gas circuit interrupters which are designed and used to interrupt high power. It is therefore a difficult problem to provide a valve construction in such a compressed gas circuit interrupter which will be cheap, reliable, respond quickly and remain gas-tight after numerous operations. The present invention concerns a novel valve construction which solves this problem.

The present invention is here illustrated as applied to the valve construction of a gas blast type of circuit interrupter, said circuit interrupter employing compressed gas to extinguish the arc drawn on the contacts of the interrupter during the opening thereof. However, such a novel valve construction has many other uses than the particular use illustrated. It may be used on other types of apparatus, but merely for purposes of illustration it is here shown as applied to a gas blast type of circuit interrupter.

The main object of the present invention is to provide an improved valve construction which will be cheap to construct, reliable in operation, rapid in response, and which will remain gas tight after many operations.

A further and more specific object of the present invention is to provide a valve construction which is based on the principle that permanent deformation of the parts of the valve assembly may be diminished by providing a plurality of absorption means for absorbing the kinetic energy of the moving parts.

A further object of the present invention is to provide an improved valve construction which reduces the impact forces on the valve seat present during the closing operation by selective loading of the valve assembly and the provision of a plurality of absorption means so that only a part of the kinetic energy stored in the moving system needs to be absorbed at the valve seat, the remainder being absorbed at one or more other points.

A more specific object of the present invention is the provision of a valve construction which will enable the valve seat to absorb only the kinetic energy present in the moving valve, the remainder of the kinetic energy of the moving system being absorbed at one or more other points.

Other objects and advantages will become apparent in the following description when considered in connection with the accompanying drawings, in which:

Figure 1 is a side elevational view, partly in section, and with certain parts omitted, of a gas blast type of circuit interrupter employing a preferred embodiment of the present invention, said embodiment being enlarged and more clearly shown in Figs. 2, 3 and 4;

Fig. 2 is an enlarged view of the valve construction shown in Figure 1, taken on the line II—II of Fig. 1;

Fig. 3 is an enlarged view of the valve construction shown in Fig. 1;

Fig. 7 is an enlarged elevational view, partly in section, of still another modification of the present invention;

Fig. 8 is an enlarged elevational view, partly in section, of the modification of the present invention shown in Fig. 7, taken on the line VIII—VIII of Fig. 7, and Fig. 9 is a plan view of the valve construction shown in Fig. 7.

Figure 4:
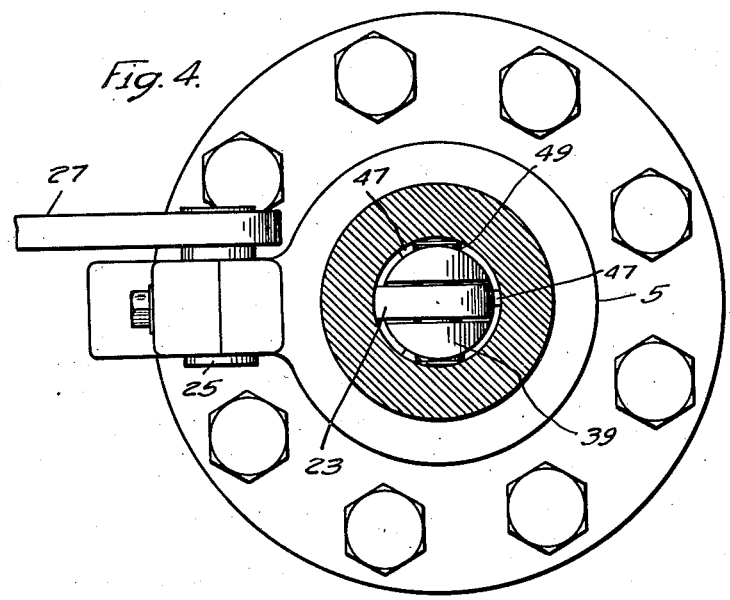
Fig. 4 is a plan view of the valve shown in Fig. 2.

Referring to the drawings, particularly to Fig. 1, the reference numeral 1 designates a tank for storing gas, such as air, under pressure. Extending from the upper end of the storage tank 1 is a relatively short flanged conduit 3, which carries a valve casing 5. Secured to the upper end of the valve casing 5 by a metallic collar connection 6 is a tubular insulator 7 which has secured to its upper end an insulating support 9. The insulating support 9 carries a stationary contact assembly 11 which is enclosed within an arc extinguishing structure 13. The arc extinguishing structure 13 is of conventional design.

Coacting with the stationary contact assembly 11 is a movable contact 15, which is preferably of blade-like construction and adapted for swinging movement about a pivot (not shown) to open and to close the electrical circuit through the breaker. The means for actuating the movable contact 15 are not shown, but they may be of any suitable type. Circuit connections to the interrupter are made through the terminal lug 17, which is electrically connected to the stationary contact assembly 11, and to another terminal lug (not shown) of the interrupter which is connected to the movable contact 15. Thus when the interrupter is in the closed circuit position, as is shown in Fig. 1, the electrical circuit is established through the terminal lug 17, through the stationary contact assembly 11, through the movable contact 15, and thence to the other terminal lug of the breaker by means not shown in Fig. 1.

The tubular insulator 7, in addition to serving as a support, also provides a passage for transmitting an arc extinguishing blast of gas from the storage tank 1 to the space between the movable contact 15 and the stationary contact assembly 11. This gas blast passage proceeds from the storage tank 1, through the short conduit 3, through the valve casing 5, through the tubular insulator 7, and finally through an opening 19 provided in the insulating support 9 which registers with the passage through the tubular insulator 7.

In the event the moving contact 15 is moved to the open circuit position while the circuit interrupter is carrying load, an arc will be drawn across the upper end of the opening 19 and will be subjected to a blast of arc extinguishing gas caused to flow through the tubular insulator 7, whereby the arc will be extinguished. Control of the blast of gas to the arc may be obtained by a valve mechanism, generally indicated by the reference numeral 20. The valve mechanism 20 comprises a valve 21 disposed in the lower end of the valve casing 5. The valve 21 is operatively coupled to one end of an actuating member 23, the other end of which is rigidly secured to a rock shaft 25 journaled in the side of the valve casing 5. The rock shaft 25 extends exteriorly of the casing 5, and is actuated by an operating lever 27, one end of which is rigidly secured to the rock shaft 25. The other end of the operating lever 27 is pivotally secured to one end of an armature 29. The armature 29 is moved upward upon the energization of a solenoid 31, schematically indicated in Fig. 1. A tension spring 33 secured at one end to the operating lever 27 and secured at the other end to a rigid support 35 serves to bias the valve 21 toward the closed position. The valve 21 is opened only during a part of the opening movement of the circuit interrupter by the energization of solenoid 31 for a short interval of time. The electrical circuit through the solenoid 31 may pass through suitable timing relays (not shown) which are actuated by the opening movement of the circuit interrupter. Consequently, the arc drawn on the contacts of the circuit interrupter during the opening movement thereof is subjected to a blast of arc extinguishing gas from the storage tank 1.

The gas blast type of circuit interrupter, illustrated in Fig. 1, is shown to indicate the type of electrical apparatus upon which the present invention may be used. The present invention can, however, be used on other apparatus which employs valves for gas or other fluid control.

The valve mechanism 20 shown in Fig. 1 is enlarged and hence more clearly shown in Figs. 2, 3 and 4. The valve 21 has an integrally formed stem 37 which is loosely inserted in a movable tubular guide casting 39. A compression spring 41, disposed between a pin 43 which is rigidly secured to the upper end of the stem 37 and a pin 45 which is rigidly secured by a press fit in the lower part of the guide casting 39, serves to bias the stem upward in Figs. 2 and 3 into the interior of the guide casting 39. The pin 45 is much smaller in diameter than a hole 42 through which it passes in the stem 37, the reason for which will be explained hereinafter. Integrally formed with the movable tubular guide casting 39 and projecting outwardly therefrom are three vertically disposed guide vanes 47, only two or which can be seen in Figs. 2 and 3. The actuating member 23 is pivotally secured to the guide casting 39 by a pin 49 which is maintained in position by two cotter pins 51. The valve 21 is preferably made very light and may be formed of heat treated aluminum. The movable tubular guide casting 39 with its integrally formed guide vanes 47 may be made more massive.

The operation of the valve mechanism 20 illustrated in Figs. 1, 2, 3 and 4 will now be explained. The valve 21 with its integrally formed stem 37 and the guide casting 39 with its integrally formed guide vanes 47 move together as a unit in the opening and closing operation of the valve mechanism 20. The movement of this unit is caused, as explained in connection with Fig. 1, by actuating member 23 moving in response to the energization of solenoid 31 (Figure 1). During the opening movement of the valve mechanism 20 from the closed position, the valve 21 is caused to move downward by the lower portion of the guide casting 39.

When the valve mechanism 20 is moved to the closed position, the valve 21 strikes the valve seat 53 before the guide casting 39 is stopped by the upper ends of the three guide vanes 47 striking the lower end of the tubular member 7. After the valve 21 has struck the valve seat 53 and has stopped, the guide casting 39 and its integrally formed guide vanes 47 are still free to move a short distance upward before the upper ends of the guide vanes 47 strike the lower end of the tubular member 7. The size of the hole 42 makes this possible.

It is thus apparent that the valve seat 53 absorbs only the kinetic energy stored in the valve 21 and its stem 37 during the closing movement of the valve mechanism 20. The rest of the kinetic energy stored in the moving valve assembly is absorbed by the lower end of the tubular member 7. It is also obvious that the valve 21 itself absorbs part of its own kinetic energy; and that the guide vanes 47 absorb part of their own kinetic energy together with part of the kinetic energy of the movable tubular guide casting 39. In this way the kinetic energy of the entire moving valve assembly is split up so that the valve seat 53 must absorb only a small fraction of the entire kinetic energy of the moving parts, whereas the remaining kinetic energy of the moving valve assembly is absorbed at other points.

The disadvantage of prior valve constructions has been that the valve seat and the valve have had to absorb the entire kinetic energy of the moving valve assembly. The stresses proved too great, and the valve seat and the valve suffered permanent deformations which resulted in a leaky valve after a few operations. In the valve construction illustrated in Figs. 1, 2, 3 and 4 the valve seat 53 and the valve 21 need absorb only the kinetic energy associated with the light valve 21 and its integrally formed stem 37 and not the kinetic energy stored in the rest of the moving valve assembly. Consequently, the stresses are small and there is no permanent deformation of either the valve 21 or the valve seat 53.

It is, of course, apparent that the guide casting 39 and its integrally formed guide vanes 47 could be stopped by inwardly projecting stop lugs formed on the inner surface of the valve casing 5, similar to the stop lug 77 in Fig. 7. It is also apparent that the valve 21 and its stem 37 may be made of aluminum so as to be light, and hence the kinetic energy associated therewith may be very small.

Figure 5:
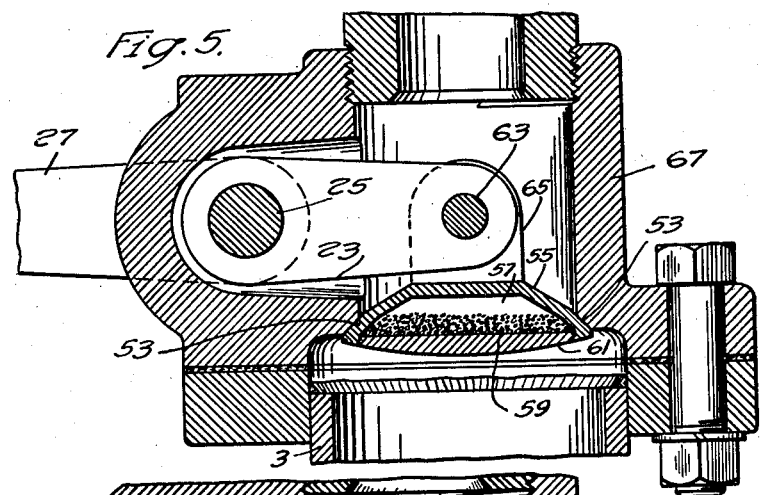
Fig. 5 is an enlarged elevational view, partly in section, of a modification of the present invention.

In the modification of the invention shown in Fig. 5 the moving valve assembly comprises a valve 55 which has had a cavity 57 machined out of it. This cavity 57 is partly filled with lead shot 59 or other loose heavy material, an air space being provided to permit motion of the lead shot 59. A lower cover plate 61 is threadedly secured to the valve 55. The actuating member 23 is pivotally secured by a pin 63 to the valve stem 65, and a valve casing 67 is provided to enclose the mechanism and to furnish a valve seat 53.

During the closing movement of the valve 55 the large mass of the valve assembly caused by the addition of the lead shot 59 tends to diminish the velocity of the valve. At the instant of first impact of the valve 55 against the valve seat 53 only the shell 55 strikes the seat 53 and is stopped. The lead shot 59 within the shell 55 continues to move upward until stopped by the top of the cavity 57. There is thus produced a series of small impacts caused by the lead shot 59 striking the top of the cavity 57, each of which is less than the elastic limit of the valve seat 53 or the valve 55. Thus the kinetic energy of the moving valve assembly is absorbed over a short period of time and at a number of different points, and not at the instant the valve 55 strikes the valve seat 53. The stress and the resulting strain in the materials at any one moment is insufficient to cause a permanent deformation of either the valve 55 or the valve seat 53. Consequently the valve 55 and the valve seat 53 remain gas tight at all times.

Figure 6:
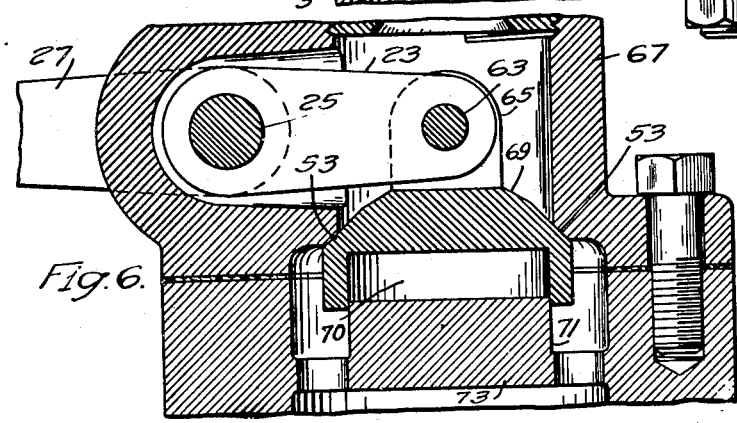
Fig. 6 is an enlarged elevational view, partly in section, of still another modification of the present invention.

The modification of the present invention shown in Fig. 6 comprises a valve 69, the lower portion of which has been so machined to form a cylindrical cavity 70, and an apertured horizontal partition 73 which has a cylindrically-shaped upstanding portion 71 which is slightly smaller in diameter than the diameter of the cylindrically-shaped cavity 70. There is thus provided in this modification an inverted dash pot cooperating with the movable valve 69 to create a partial vacuum or reduced pressure region within the cavity 70 during the closing operation of the valve 69. It is obvious that when the valve 69 is moved by the operating mechanism from the open to the closed position the creation of a reduced pressure region within the cavity 70 will greatly slow this motion. The difference in pressure through any valve normally assists the valve to close, and hence to increase the kinetic energy thereof. In this modification of the present invention, however, this normal assistance by the pressure differential is rendered inoperative because of the stationary horizontal partition 73 and the inverted dash-pot arrangement. The result is slow motion upon closing and a low kinetic energy in the moving valve parts. The valve seat 53 and the valve 69 can readily absorb this small quantity of kinetic energy. There is, consequently no permanent deformation of either the valve 69 or the valve seat 53.

Figs. 7, 8 and 9 together show still another modification of the present invention. In this modification of the invention a valve casing 75 has integrally cast therewith a stop lug 77 projecting inwardly from the inner wall of the valve casing 75. Also cast integrally with the valve casing 75 is a horizontal partition 79 which is centrally drilled to guide the movement of a valve stem 81. The partition 79 contains a plurality of apertures 83 to permit the flow of gas through the valve casing 75. The lower portion of the valve casing 75 is machined out to permit the insertion of a washer-shaped resilient or spring member 85, the inner periphery of which constitutes a valve seat 87 for a valve 89. The outside periphery of the washer-shaped spring member 85 is machined to form a retaining groove 91 for a washer-shaped sealing gasket 93 which seals the valve casing 75 and also the washer-shaped spring member 85 with the flange 95. The flange 95 has a small upstanding ridge 97 at its upper surface which bites into the washer-shaped sealing gasket 93 when the flange bolts 99 and the flange nuts 101 are tightened. A second washer-shaped gasket 103 is provided to assist the sealing between the valve casing 75 and the upper surface of the flange 95.

The rock shaft 25 is rigidly secured to one end of an actuating member 105, the other end of which is pivotally secured by a pin 107 to a vertically disposed cylindrical hollow connecting member 109. An off-standing lug 111 is provided at the right end of actuating member 105, looking at Fig. 7, which engages the stop lug 77 when the valve mechanism is in the completely closed position. As more clearly shown in Fig. 8, the connecting member 109 is provided with a relatively large horizontal aperture 112 for a pin 113, said pin 113 being rigidly secured by a press fit to the valve stem 81. A compression spring 115 is vertically disposed between the pin 113 and the lower end portion of the vertically disposed cylindrical hollow connecting member 109 to bias the valve 89 and its integrally formed stem 81 upward. Since the horizontal aperture 112 in the connecting member 109 is much larger in diameter than the diameter of the pin 113, there is some relative motion permissible between the valve 89 with its integrally formed stem 81 and the vertically disposed hollow connecting member 109.

The operation of the valve construction illustrated in Figs. 7, 8 and 9 will now be described. When the valve 89 is in the open position, the valve 89 and its integrally formed stem 81 being biased upward by the compression spring 115, cause pin 113 to rest against the upper side of the aperture 112. When the valve 89 is closed, the valve 89 strikes the valve seat 87 before the vertically disposed hollow connecting member 109 and the actuating member 105 are both stopped by the stop lug 77. Thus the valve seat 87 must absorb only the kinetic energy of the movable valve 89 and its integrally formed stem 81 and not the kinetic energy of the rest of the valve assembly, the latter being wholly absorbed by the stop lug 77. It is of course, apparent that the valve 89 will assist the valve seat 87 in the absorption of the kinetic energy of the valve 89 and its stem 81; and also that the lug 111 will assist the stop lug 77 in the absorption of the kinetic energy of the moving valve assembly.

It will be noted that the form of the washer-shaped spring member 85 is such as to enable the valve seat 87 to be resilient in operation. The construction of the resilient valve seat 87 is described and claimed in a copending patent application of Arthur M. Wahl and Frederick B. Johnson entitled "Flexible valve seat for air blast circuit breakers" filed October 30, 1941, Serial No. 417,146, now U. S. Patent 2,352,047 issued June 20, 1944, and assigned to the assignee of this application. It will also be noted that the moving valve assembly is guided by guide means 70 which are stationary and hence store no kinetic energy which must be absorbed. The result is a relatively light valve mechanism, the total kinetic energy of which is relatively small. Of this relatively small amount of kinetic energy to be absorbed in the closing operation, only a small fraction of it must be absorbed at the flexible valve seat 87, the rest being wholly absorbed by the stop lug 77 and the lug 111. This construction eliminates any permanent deformation of either the valve 89 or the valve seat 87. The valve 89 and the valve seat 87 remain gastight after many operations.

It is to be clearly understood that the present invention is not limited to electrical apparatus, but may be utilized on any apparatus, not necessarily electrical, which uses valves for gas or fluid control. For purposes of illustration only has the invention been described in terms of its use on a gas blast type of circuit interrupter.

Although we have shown and described specific structures, it is to be understood that the same are only for purposes of illustration and that changes and modifications may be made by those skilled in the art without departing from the spirit and scope of the appended claims.

We claim as our invention:

1. In a valve mechanism, a valve means, means for operating said valve means to the open and closed positions and also operable to positively complete the closing operation every time its movement is initiated in the closing direction, a seat for the valve means, and means including the seat for successively absorbing the kinetic energy stored in said valve means and said second-mentioned means during a closing operation when the valve means strikes the seat.

2. In a valve mechanism, a valve, a valve seat, a movable valve actuating mechanism operable to positively complete the closing operation every time its movement is initiated in the closing direction, and means causing a part of the kinetic energy of the movable valve actuating mechanism to be absorbed at one or more other points than at the valve seat after the valve has come to rest at its seat.

3. In a valve mechanism, a valve, a valve seat, a mechanism for operating said valve to the open and closed positions, said mechanism being operable to positively complete the closing operation every time its movement is initiated in the closing direction, and means whereby the valve seat and the valve must absorb substantially only the kinetic energy associated with said valve during a closing operation, the kinetic energy associated with said mechanism being absorbed at one or more points other than at the valve seat.

4. In a valve mechanism, a movable valve, a seat for the valve, operating means for operating said valve operable to positively complete the closing operation every time its movement is initiated in the closing direction, means permitting relative motion between said valve and said operating means, and a plurality of means including the seat for absorbing the kinetic energy associated with said movable valve and said operating means when the valve strikes the seat during a closing operation.

5. In a valve mechanism, a movable valve, a valve seat, movable actuating mechanism associated with said movable valve operable to positively complete the closing operation every time its movement is initiated in the closing direction, and means for permitting said valve seat and said valve to absorb substantially only the kinetic energy associated with said movable valve, the kinetic energy of the movable actuating mechanism associated with said valve being absorbed at one or more points other than at said valve seat.

6. In a valve mechanism, a movable valve and a seat therefor, movable operating means associated with said movable valve operable to positively complete the closing operation every time its movement is initiated in the closing direction, movable guide means associated with said movable valve, and means for causing the kinetic energy associated with said movable operating means and with said movable guide means to be absorbed at one or more points other than at the valve seat.

7. In a valve mechanism, a movable valve and a seat therefor, operating means for the actuation of said valve operable to positively complete the closing operation every time its movement is initiated in the closing direction, movable guide means for said movable valve, a flexible connection between said movable valve and said movable guide means permitting relative motion between said movable valve and said movable guide means, and means for the absorption of at least a part of the kinetic energy associated with said movable guide means other than at said valve seat.

8. In a valve mechanism, a movable valve and a seat therefor, operating means for the actuation of said movable valve operable to positively complete the closing operation every time its movement is initiated in the closing direction, movable guide means interposed between said operating means and said movable valve, a lost-motion connection between said movable guide means and said movable valve, means for permitting said valve seat to absorb substantially only the kinetic energy associated with said movable valve, and means for a later absorption of the kinetic energy associated with said movable guide means and said operating means during the operation of said valve at one or more points other than at said valve seat.

9. In a valve mechanism, a movable valve and a seat therefor, operating means for the actuation of said movable valve operable to positively complete the closing operation every time its movement is initiated in the closing direction, movable guide means interposed between said operating means and said movable valve, a pin and slot connection between said movable valve and said movable guide means, and means for causing said movable valve to strike said valve seat before said movable guide means is brought to rest so that said valve seat need not substantially absorb the kinetic energy associated with said movable guide means.

10. In a valve mechanism, a movable valve and a seat therefor, operating means for the actuation of said movable valve, a movable tubular-shaped guide member pivotally connected to said operating means and having outwardly projecting guide vanes, said movable valve being connected to the other end of said tubular-shaped guide member by a pin and slot connection permitting relative movement between said movable valve and said tubular-shaped guide member, the arrangement being such that upon closing the valve mechanism the movable valve strikes the valve seat prior to the stopping of said tubular-shaped guide member, the valve seat consequently absorbing substantially only the kinetic energy associated with said movable valve and not the kinetic energy associated with said tubular-shaped guide member.

11. In a valve mechanism, movable valve mechanism, a valve seat for bringing the valve mechanism to rest during the closing operation, relatively movable material loading the movable valve mechanism so that the absorption of the kinetic energy associated with the movable valve mechanism when it is brought to rest at the seat will take place in a series of successive steps.

12. In a valve mechanism, a movable valve and a cooperating movable operating mechanism therefor, a valve seat for bringing the valve to rest during the closing operation, loose material movable with said movable valve and with said movable operating mechanism, said loose material being so disposed that in bringing the movable valve and the movable operating mechanism to rest at the seat the absorption of the kinetic energy associated with said loose material takes place in a series of successive steps.

13. In a valve mechanism, a movable valve, a seat for bringing the valve to rest during the closing operation, said movable valve having associated therewith a cavity, said cavity containing some loose material, the closing operation of said movable valve being such that after the movable valve is brought to rest at the seat the loose material is later brought to rest.

14. In a valve mechanism, a casing for said valve mechanism, a movable valve, a valve seat for said valve, operating mechanism for said movable valve connected therewith by a flexible connection and operable to positively complete the closing operation every time its movement is initiated in the closing direction, and means other than said valve seat for the absorption of at least a part of the kinetic energy associated with said operating mechanism during the closing operation of said valve.

15. In a valve mechanism, a casing for said valve mechanism, a movable valve, a valve seat for said valve, operating mechanism for said valve operable to positively complete the closing operation every time its movement is initiated in the closing direction, a flexible connection between said operating mechanism and said movable valve, a stopping means for said operating mechanism to absorb the kinetic energy associated therewith, said stopping means being operative after said movable valve is brought to rest by striking the valve seat.

16. In a valve mechanism, a casing for said valve mechanism, a movable valve, a valve seat for said valve, operating mechanism for said valve, a pin and slot connection between said operating mechanism and said movable valve, a stop lug projecting inwardly from the interior of said casing to engage said operating mechanism after the movable valve is brought to rest at the valve seat.

17. In a valve mechanism, a casing for said valve mechanism, a movable valve, a valve seat for said valve, and operating mechanism for said movable valve, a lost-motion flexible connection between said operating mechanism and said movable valve, stationary guide means for said movable valve disposed in said casing, a stop lug extending inwardly from said casing to engage the operating mechanism and bring the operating mechanism to rest after the movable valve has been engaged by said valve seat.

18. In a valve mechanism, a valve, a seat for said valve, means for operating said valve to the open and closed positions and operable to positively complete the closing operation every time its movement is initiated in the closing direction, and means for causing substantially only the kinetic energy stored in the valve to be absorbed at said seat during the closing operation of the valve, the absorption of the kinetic energy stored in said first-mentioned means taking place at one or more points other than at said seat.

BENJAMIN P. BAKER.
RICHARD C. CUNNINGHAM.